W. A. DUNCAN.
Hay Rake and Loader.
No. 46,647.  Patented March 7, 1865.
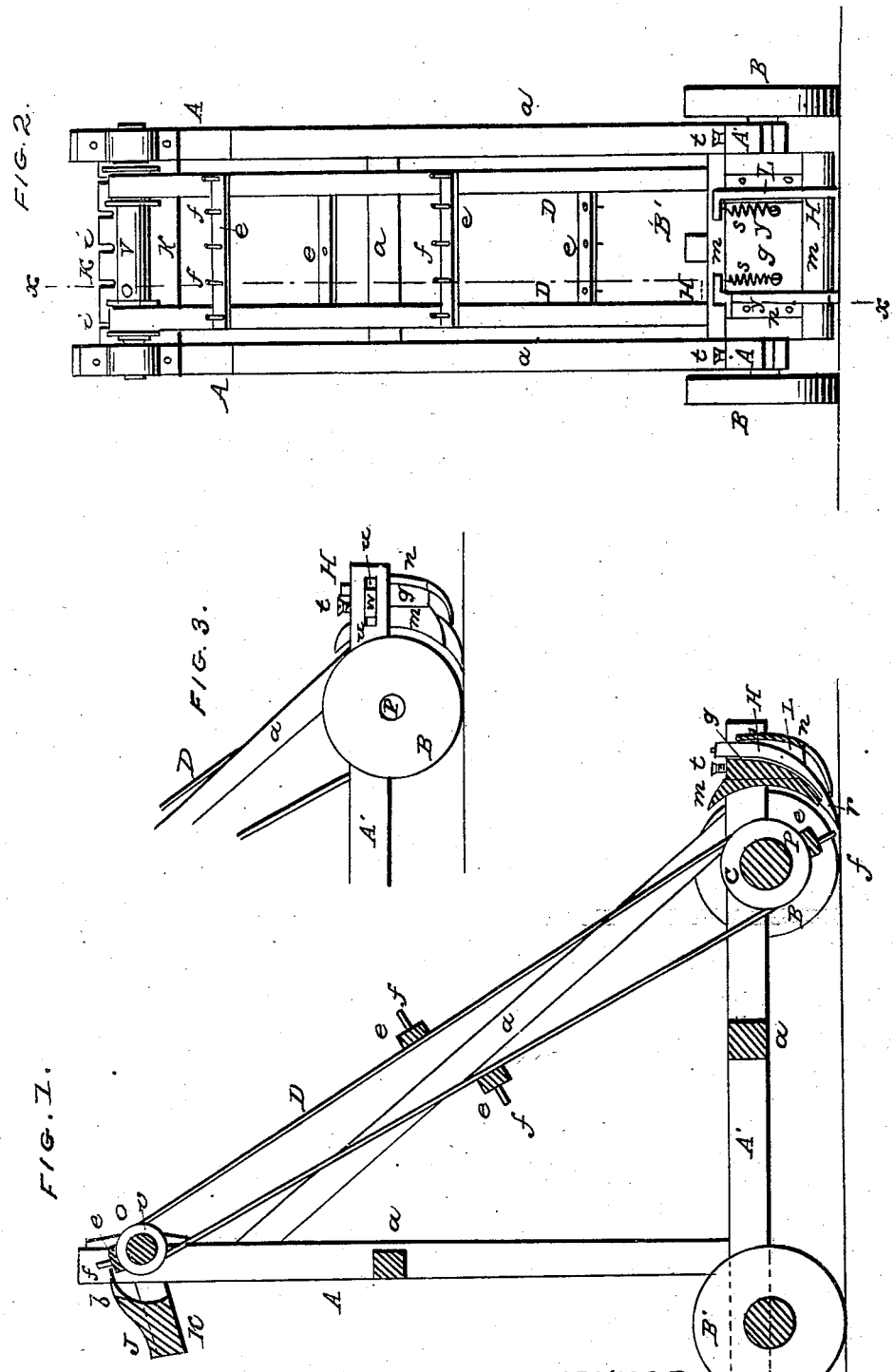

UNITED STATES PATENT OFFICE.

WILLIAM A. DUNCAN, OF SYRACUSE, NEW YORK.

IMPROVEMENT IN MACHINES FOR RAKING AND LOADING HAY.

Specification forming part of Letters Patent No. 46,647, dated March 7, 1865.

*To all whom it may concern:*

Be it known that I, WILLIAM A. DUNCAN, of Syracuse, in the county of Onondaga and State of New York, have invented a new and Improved Hay Rake and Loader; and I do hereby declare that the following is a full, clear, and exact description thereof, which will enable others skilled in the art to make and use the same, reference being had to the accompanying drawings, forming part of this specification, in which—

Figure 1 is a longitudinal vertical section of my invention through the line $x$ $x$ in Fig. 2. Fig. 2 is a rear end view of my invention. Fig. 3 is a side elevation of the rear portion of the same, and is for showing the mode of adjusting the rake with relation to the elevating machinery.

Similar letters of reference indicate like parts.

This invention relates to certain improvements in a hay raking and loading machine in which the raking and loading apparatus is supported on wheels and attached to the rear end of the hay-wagon, and is thereby drawn over the field, the hay being elevated from the rake and thrown into the wagon by the ordinary means of an endless apron, or by belts to which are attached transversely a series of small rake heads and fingers for taking hold of the hay, and the said apron or belts being driven from the axle of the supporting-wheels.

My improvement consists, first, in a wedge-shaped device situated at the top of the elevator for clearing the hay from the elevating-fingers when it has arrived at the point from which it drops into the hay-wagon; and, secondly, in an improved manner of suspending each tooth of the rake, so that by a sliding vertical movement or by a longitudinal yielding motion of the point of each tooth they may readily pass obstructions or accommodate themselves to any uneven surfaces of ground; and, thirdly, in combining and using in connection with the rake-teeth a circular guard-board to prevent hay from escaping the elevating-fingers by working through between the rake-teeth, and also prevent hay from clogging and obstructing the said rake-teeth.

A' A $a$ $a$ $a$ is the frame-work; B' B B, the supporting-wheels, the forward end of the machine being supported by a single wheel, B', and the rear end by a pair of wheels, B B, Fig. 2, to the axle of which, P, Fig. 1, are secured two pulleys, C, which drive the elevating-belts D D, Fig. 2, said belts passing over the pulleys O O on the shaft V at the top of the frame. These belts D D are provided with a series of small rake-heads, $e$ $e$ $e$ $e$, which are armed with fingers $f f f$ for securing a hold of the hay.

The wedge-shaped clearing device K is secured to the top of the uprights A A, and on the front side of the same, with its face toward the shaft V and elevating-belts D D, said face of wedge K being of sufficient length to fully cover the entire width of the elevating apron or belts D D, Fig. 2. The device has a series of slots, $i$ $i$ $i$ $i$, in its face which correspond in number to the number of fingers $f f f$ on each of the rake-heads $e$ $e$ $e$.

The rake-head $g$, which is located at the rear end of the machine and behind the axle P, is suspended in the horizontal frame-pieces A' A', Fig. 2, by means of a tenon, W, Fig. 3, upon each end of the rake-head $g$, said tenon W occupying longitudinal slots $u$ $u$ in the frame-pieces A' A', so that the rake-head $g$ may be adjusted nearer to or farther from the axle P and elevating-belts D D, and is secured at such point of adjustment by the set-screws $t$ $t$.

To the front side of the rake-head $g$ is secured a circular guard-board, $m$, which presents a concavity toward the axle P, said concavity, in form, corresponding, or nearly so, to the arc of a circle described by the points of the fingers $f f f$ when passing around behind the axle P. The rear side of the rake-head $g$ is provided with curved vertical channels L, Fig. 1, and in each of these curved channels L there is a curved rake-tooth, H. The top of each rake-tooth H is bent over sidewise to a right angle with its body, and forms an arm which strikes upon the top of the rake-head $g$ and holds the tooth H from being forced down below a certain depth, but leaves it free to be raised. To this bent head of each tooth H is attached a spiral spring, S, Fig. 2, which is arranged perpendicularly beneath the said bent heads of the teeth H. The other or lower end of the spiral spring S is attached to the lower part of the rake-head $g$, and to the rear side of the same. The rake-head $g$ immediately opposite the body of the spiral spring S, is cut away, so as to form a shallow cavity or recess, $y$, Fig. 2, which is occupied by a portion of the body of the said spiral spring S.

The rake-teeth H are confined in the channels L by a flat curved spring, n, (see Fig. 2,) which is screwed on the rake-head g, so as to close the open side of the channels L, and also cover the rake-teeth H and confine them in the said channels L. The lower part of the flat curved springs n are of the same width as the rake-teeth H; but one side of the upper part of each spring n is extended laterally onto the flush part of the rear side of the rake-head g and securely fastened thereunto by screws. The lower end of the curved spring n, Fig. 1, rests against the rear side of the lower end of the tooth H, and furnishes an elastic support for the said lower end of the tooth H. At the top of the channel L, Fig. 1, the rake-teeth H are flush with the rear side of the rake-head g, and the upper and fixed part of the springs n comes against the rear of the upper parts of the teeth H, so as to allow of no longitudinal movement of the same; but the channels L are made deeper toward their lower extremities, so that the lower part of the teeth H may move to the rear more or less before coming in contact with the fixed part of the spring n. The lower ends of the rake-teeth H are provided each with a notch, r, Fig. 1, which catches upon or engages with the lower edge of the guard-board m.

The operation of my invention is as follows: As the machine is drawn forward in the direction indicated by the red arrow, Fig. 1, an upward motion is given to the belts D D by means of the pulleys C, and the fingers f f take the hay from the rake-teeth H as it is collected, and, sweeping it up within the concavity of the guard-board m, convey it to the top of the elevator, where the hay is lifted clear of the fingers f f by the wedge K, the fingers f f passing down through the slots i i i in the face of the wedge K and returning to the rake, and the hay, after being cleared from the said fingers f f, slides down over the inclined upper surface, J, of the wedge K and falls from the front edge of the same into the hay-wagon. The rake-head g and the guard-board M, being adjustable with relation to the elevating apparatus, may be adjusted by means of the set-screws t t nearer to or farther from the elevating-fingers f f, so as to readily secure the most effective working of the said elevating parts. When one of the teeth H meets with an obstruction, it resists the same until said resistance becomes sufficient to force the notch r in the lower part of the tooth H, Fig. 1, clear of the lower edge of the guard-board m, when the tooth readily yields and slides upward in its channel, the amount of resistance offered by the rake-tooth H before it slips clear from the lower edge of the guard-board being determined by the strength of the curved spring n, which presses against the rear of the tooth and holds the notch r onto said edge of the guard-board m until the resistance offered is sufficient to overcome the said spring n. When a tooth H has been raised, it is again thrown down as soon as it has passed the obstruction by the spiral spring S, Fig. 2, and this spring also holds the tooth snug down to its work in any position above that in which the notch r is engaged with the edge of the guard-board m.

I claim as new and desire to secure by Letters Patent—

1. The slotted clearing-wedge K, when located in front of the upper shaft, V, and constructed with slots i i, projecting over the said shaft, and with an inclined conductor, J, all as herein shown and described.

2. The vertical sliding rake-teeth H, operating substantially in the manner and for the purpose set forth.

3. The springs n, when constructed as herein shown and described, and employed in combination with the channels L and teeth H, in the manner and for the purpose specified.

4. The combination of the springs S and the springs n with the teeth H, whereby a yielding horizontal and a yielding vertical play is allowed to the teeth A, substantially in the manner and for the purpose described.

5. The longitudinal adjustment of the rake-head g to and from the elevator, substantially in the manner and for the purpose set forth.

6. The combination of the slotted clearing-wedge K, the curved guard-board m, and the vertical sliding rake-teeth H with the endless apron or elevator D, all arranged substantially in the manner and for the purpose described.

WILLIAM A. DUNCAN.

Witnesses:
AUGUSTUS J. GOFFE,
JOHN BARNEE.